May 15, 1934.　　　　F. REISS　　　　1,958,679
PHOTOMETER AND METHOD OF OPERATING SAME
Filed Feb. 26, 1931
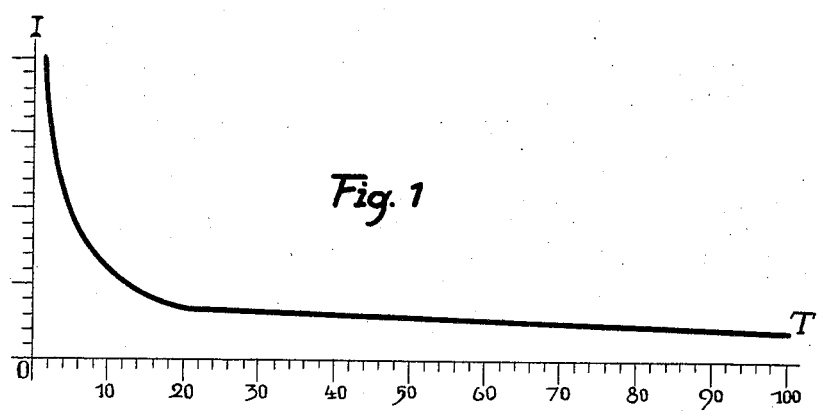
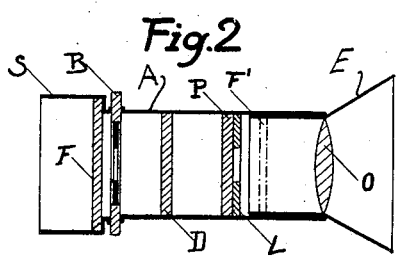
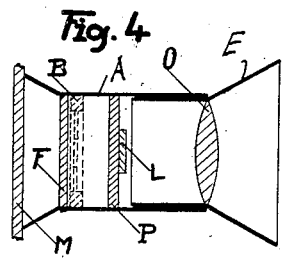
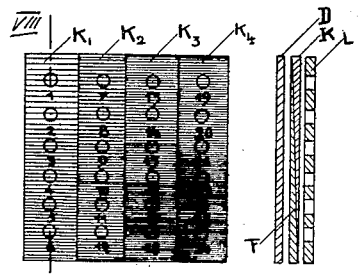
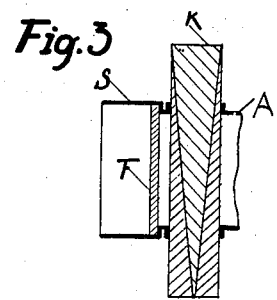
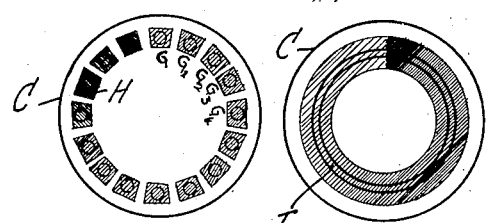
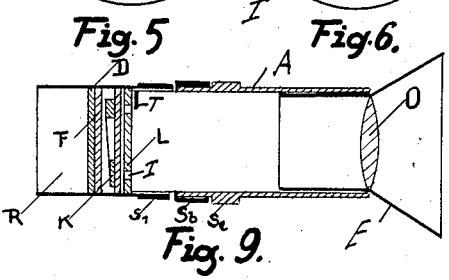
Inventor:
Friedrich Reiss
by Karlinghaus
Atty.

Patented May 15, 1934

1,958,679

UNITED STATES PATENT OFFICE 1,958,679

PHOTOMETER AND METHOD OF OPERATING SAME

Friedrich Reiss, Vienna, Austria

Application February 26, 1931, Serial No. 518,513
In Austria April 4, 1930

1 Claim. (Cl. 88—23)

My invention relates to photometers, more particularly of the kind in which the light to be measured is admitted to a comparison area and compared with the light emitted by a source of light which is independent of the light to be measured.

It is an object of my invention to provide improved means for measuring the intensity of a given source of light through the medium of a luminous substance or surface.

Photometers in which a permanently self-luminous surface is compared with an area to which the light to be measured is admitted, have already been suggested. A photometer of this type is described for instance in U. S. Patent 1,514,665, dated November 11, 1924.

Photometers of this kind involve two drawbacks: The intensity of the permanently self-luminous substance must be constant, a condition which, as will be explained below, cannot be fulfilled in practice, and the light intensity of the substance cannot be adapted to the intensity of the light to be measured.

Regarding the first point, it is known that commercial self-luminous substances, for instance such as contain mesothorium compounds, are very short-lived. In the cheap mesothorium compounds which contain only traces of radium the light emission is reduced about 50% within six months. Substances having a longer life might be obtained with a higher percentage of radium compounds, but such substances could not be manufactured at a commercial price and, moreover, the radium compounds, if admixed in a percentage required for rendering the substance suitable, would attack both the coloring matter and the binder.

However, even if it were possible to manufacture a commercial permanently self-luminous substance of satisfactory properties, the second point would still have to be considered. If the intensity of the light radiated from a self-luminous substance is constant, it may occur that the light to be measured, although its intensity may be such as to permit the taking of photographs, is still so weak that the comparison area is over-radiated by the light from the substance.

It has also been suggested to use as the independent source of light a phosphorescent substance, i. e. a substance or body which after exposure to light becomes temporarily self-luminous. The intensity of such phosphorescent substances, however, is not permanent, but decreases very rapidly from the maximum intensity. To overcome this variability in light intensity, it has been proposed to compare the light to be measured with the light of the phosphorescent body immediately after this body has been exposed to its maximum intensity, i. e. by comparing the light to be measured with the apparent constant maximum, by darkening the light to be measured to the maximum phosphorescence (a photometer of this type is described for instance in German Patent 130,964). Since the intensity of the phosphorescence while being compared with the light to be measured does not retain its maximum, the comparison is not based on a constant value of intensity as presumed, but on an indeterminable variable amount of light intensity. Thus the results obtained by the known photometers using a phosphorescent substance are inexact. Besides, it may also occur, that the maximum of light intensity of the phosphorescent body be greater than the light intensity to be measured, as it may happen with studio photographs.

It is an object of the invention to overcome the aforesaid drawbacks. The invention is based on the idea that it is not necessary to compare the light to be measured with a constant light intensity, and that it is sufficient in practice to base the comparison on a variable light intensity, when there is the possibility of calculating or determining by experience the amount of the light intensity which the phosphorescent body has at the moment of comparison.

In the case of a phosphorescent substance as for instance luminous paint, the amount of light intensity at any moment is a function of the time elapsed since the moment of the phosphorescent body's exposure to its maximum. There must be therefore for each given intensity to be measured a distinct point of time, at which the intensity of the phosphorescence is equal to the intensity of the light to be measured.

Thus I may compare the light to be measured with the phosphorescent substance by darkening the light to be measured at a given moment after the exposure of the phosphorescent body to light, in such a degree that the two intensities to be compared be equal. Different moments may be used for the comparison in accordance with the light intensities of the groups to be measured, such groups being for instance a sunny landscape, light studios or more or less dark rooms, and a longer time may be allowed to elapse for photographs taken in a dark room than at full daylight.

It is another object of my invention to provide improved photometers for performing this new method.

In the drawing affixed to this specification and forming part thereof I have shown an intensity curve for a phosphorescent substance, and have also illustrated diagrammatically and by way of example several photometers embodying my invention.

In the drawing

Fig. 1 is the intensity curve referred to, with intensity plotted against time,

Fig. 2 is an axial section of a photometer having an iris diaphragm for graduating the intensity of the light to be measured, Fig. 3 illustrates the object end of the photometer in Fig. 2, with a light filter instead of the diaphragm, Fig. 4 is a section of a photometer which is adapted to be applied to the ground-glass plate of a camera with its object end, Fig. 5 is an elevation of a support for the phosphorescent substance, or a plate of such substance, having perforations covered by graduated light-absorbing filters, Fig. 6 is an elevation of a support or plate having a single aperture in the shape of a circular slot, with a single graduated light-absorbing filter, Fig. 7 is an elevation, Fig. 8 is a section on the line VIII—VIII in Fig. 7 showing a modification of the support or plate illustrated in Fig. 5, and Fig. 9 is an axial section of a photometer with the support or plate illustrated in Fig. 6.

Referring now to the drawing, and first to Fig. 1, I is the intensity of the light emitted from a phosphorescent substance, body or surface, for instance a support coated with or a plate made of luminous paint, as for instance zinc sulfide or a Balmain's luminous paint, a preparation of calcium sulfide, containing traces of sodium thiosulfate and bismuth oxide, and T is the time in seconds against which the intensity I is plotted. Obviously the intensity of the phosphorescent is a maximum immediately after the substance has been exposed. If the substance is exposed to daylight, the maximum is practically the same for all intensities, while in the case of artificial light the maximum is a function of the properties of the light. The maxima for light of various properties have been calculated and are registered on a table which is supplied with the photometer.

As will appear from the diagram in Fig. 1, the decrease of intensity is rapid at first, in the present instance during the first twenty seconds, and this range must not be used for measuring, because the intensity decreases within in this range considerably even during the smallest interval of time. Later on the decrease becomes so gradual that the intensity may be considered as constant for a certain period, say 5 seconds, and measurements may be taken at this more gradual range.

For instance at full daylight the intensity of the phosphorescent substance after 20-25 seconds may still be such as to be comparable with the comparison area, while in dark rooms or under other unfavorable light conditions the time required for reducing the intensity of the substance to the extent required for preventing overradiating of the comparison area may be 1 or 2 minutes.

The only expedient in photometers of the old type for darkening the light from the permanently self-luminous substance, if the light to be measured is weak, consists in placing gray filters or the like in front of the luminous surface, but this is unsatisfactory, because it is extremely difficult to avoid the formation of troublesome border lines between the luminous surface and the comparison area. Moreover the cost of a photometer having such darkening means would be prohibitive and it could only be used by a skilled person and not by the average amateur.

Referring now to Fig. 2, A is the casing of the photometer, S is the sun shade, F is a filter and E is an eye shade. B is a stop, preferably an iris diaphragm, D is a plate of ground glass or the like diffusing the light, P is a transparent support and L is a layer or plate of a phosphorescent substance on a portion of the support P. The layer in the present instance is annular and surrounds the comparison area at the centre of the support P, but obviously the layer or the like might be modified, being for instance star-shaped, circular, or the like. F' is a colored filter which may be provided for adapting the color of the light radiated from the comparison area to the color of the light radiated from the phosphorescent surface L. O is an ocular lens at the inner end of the eye shade E. Preferably the support P is provided with an opaque layer (not shown) at the face opposite the layer L which keeps the light to be measured away from the layer, as it might interfere with the regular decrease of intensity shown by the curve in Fig. 1.

The diaphragm B is provided for adapting the intensity of the light to be measured to the intensity of the surface L by darkening the comparison area. As shown in Fig. 3, a wedge-shaped gray filter K may be inserted instead of the iris diaphragm B. Darkening of the comparison area may be effected by other means, for instance by polarization.

Fig. 4 illustrates a photometer which is adapted to be applied directly to the ground-glass plate M of a camera. Here the diaphragm B or the corresponding means is not indispensable, as its function may be performed by the diaphragm of the camera, and therefore the diaphragm B has been shown in dotted lines. The layer L on the support P is not annular, as shown in Fig. 2, but circular, so that it occupies only the central portion of the support and is surrounded by the annular comparison area. A photometer of this type may be used for ascertaining the time of exposure in cameras and enlargers.

Instead of a transparent support P with a layer L the opaque and perforated or slotted supports or plates illustrated in Figs. 5 and 6 may be provided.

Referring first to Fig. 5, the support C is coated throughout with the phosphorescent substance, or made of such substance, and has a circular row of perforations $G_1$, $G_2$ . . . each of which is covered by a gray filter H. The filters are graduated, i. e. each succeeding filter has higher light-absorbing power than the preceding one.

Referring now to Fig. 6, the support C has a circular slot I which is covered by an annular filter of graduated absorbing power.

Referring now to Figs. 7 and 8, the layer of plate L is equipped with rows of perforations 1-24, and gray filters $K_1$—$K_4$ of wedge section, the absorbing power of which increases from the left to the right in Fig. 7, are arranged at the rear of the perforations in the layer L and in front of the diffusing plate D. The system is shown square but might obviously be circular or of any other convenient shape.

Fig. 9 illustrates a support or plate C as shown in Fig. 6, with the annular slot I in combination with a tubular casing A, as shown in Figs. 2-4, but obviously the supports or plates illustrated in other figures might also be provided. The support or plate C with the filter Q at the rear of its slot I, the filter F and the diffusing plate D, are contained in a tube R which is mounted to rotate on the casing A. T is an index on the objective and of the casing A.

In the photometers according to Figs. 5-9 the intensity, at which the operation with the photometer should be stopped, is indicated by one of the openings G in the phosphorescent surface, or a given portion of the filter Q, or one of the openings 1-24, merging with the phosphorescent surface of the predetermined time after such surface has been exposed to light. All other openings or filter portions are distinguished by being lighter or darker than the phosphorescent surface. Each opening in Figs. 5, 7 and 8 is marked in the example illustrated by a numeral, and the numerals or the other marks are registered on a table with the corresponding times of exposure against them.

In the photometer illustrated in Fig. 9 $S_1$ is a scale of exposures on the inner end of the tube R, $S_b$ is a scale of diaphragms, and $S_e$ is a scale of sensibilities, both on the outer end of the tubular casing A on which the tube R with the scale $S_1$ is mounted to rotate as described. By rotating the tube R the opening G (Fig. 5) or the portion of the filter Q (Fig. 6) or the openings 1-24 (Figs. 7 and 8), which merges with the luminous surface L, is moved into registering relation with the index T and the exposure for a given diaphragm on scale $S_b$ is read directly from the scale $S_1$.

In operation the phosphorescent surface is exposed to light, for instance daylight, during a few seconds and is then replaced in the photometer. The operator now holds the photometer to his eye and within the periods indicated in his table, say, 20 seconds, (60 sec., 120 sec.), gradually darkens the comparison area by means of the diaphragm B (Fig. 2) or the gray filter K (Fig. 3), until the comparison area merges into the phosphorescent surface, or he rotates the tube R until one of the openings G, a portion of the filter Q, or one of the openings 1-24 which just merges with the luminous surface L or C, registers with the index T, and stops the measuring after the indicated time.

By provided the colored filter F' the ascertaining of the merging point is facilitated, because the phosphorescent substance or surface and the comparison area appear in the same color.

Various changes may be made in the details disclosed in the foregoing specification without departing from the invention or sacrificing the advantages thereof.

In the claim affixed to this specification no selection of any particular modification of the invention is intended to the exclusion of other modifications thereof and the right to subsequently make claim to any modification not covered by these claims is expressly reserved.

I claim:

The method of operating photometers by comparing the light to be measured with the light from a source of light which is independent of the light to be measured comprising exposing a phosphorescent substance to light, waiting a predetermined time after the exposure of the substance until a definite value of the intensity curve of the phosphorescent substance is reached, which does not depend on the nature of the light to which the substance is exposed, and gradually darkening the light to be measured within this time interval so that after this time interval has lapsed, its intensity is the same as the intensity of the light emitted by the phosphorescent substance.

FRIEDRICH REISS.